US009264679B2

(12) United States Patent
Tickoo et al.

(10) Patent No.: US 9,264,679 B2
(45) Date of Patent: Feb. 16, 2016

(54) MAINTAINING DISTORTION-FREE PROJECTION FROM A MOBILE DEVICE

(71) Applicant: Texas Instruments Incorporated, Dallas, TX (US)

(72) Inventors: Manasvi Tickoo, Cambridge, MA (US); Vinay Sharma, San Francisco, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 215 days.

(21) Appl. No.: 14/102,320

(22) Filed: Dec. 10, 2013

(65) Prior Publication Data

US 2014/0160341 A1 Jun. 12, 2014

Related U.S. Application Data

(60) Provisional application No. 61/735,336, filed on Dec. 10, 2012.

(51) Int. Cl.
*H04N 9/31* (2006.01)
*H04N 5/232* (2006.01)
*G06F 1/16* (2006.01)

(52) U.S. Cl.
CPC ......... *H04N 9/3185* (2013.01); *H04N 5/23293* (2013.01); *H04N 9/3176* (2013.01); *G06F 1/1639* (2013.01)

(58) Field of Classification Search
CPC ............... H04N 5/23293; H04N 5/74–5/7491; H04N 9/3176; H04N 9/3185; G03B 21/147; G03B 17/54; H04M 1/0272; G06F 1/1639
See application file for complete search history.

(56) References Cited

U.S. PATENT DOCUMENTS

| 6,527,395 | B1 * | 3/2003 | Raskar | G03B 21/14 353/70 |
|---|---|---|---|---|
| 2008/0259289 | A1 * | 10/2008 | Nozaki | G03B 17/00 353/70 |
| 2009/0073324 | A1 * | 3/2009 | Tan | G03B 21/00 348/745 |
| 2010/0079653 | A1 * | 4/2010 | Pance | H04N 9/3176 348/333.1 |
| 2011/0176007 | A1 * | 7/2011 | Ding | G06T 7/0018 348/189 |
| 2012/0313974 | A1 * | 12/2012 | Ueno | H04M 1/21 345/668 |

OTHER PUBLICATIONS

"Digital Light Processing", Wikipedia, pp. 1-8, available at http://en.widipedia.org/wiki/Digital_Light_Processing on Dec. 5, 2013.
"DLP Pico Projectors", Texas Instruments, pp. 1-2, available at www.dlp.com/pico-projector/phone/default.aspx on Dec. 5, 2013.
"How DLP Technology Works", DLP Technology, Texas Instruments, pp. 1-2, available at www.dlp.com/technology/how-dlp-works/default.aspx on Dec. 5, 2013.
Vinay Sharma, "Camera Pose Estimation", U.S. Appl. No. 14/051,161, filed Oct. 10, 2013, pp. 1-25.

* cited by examiner

*Primary Examiner* — Dennis Hogue
(74) *Attorney, Agent, or Firm* — Gregory J. Albin; Charles A. Brill; Frank D. Cimino

(57) ABSTRACT

A mobile device, such as a smart phone, is provided with a camera and a projector. A user may select a still image or a video sequence and project it onto a viewing surface using the mobile device. Once the viewer selects a preferred perspective view frame, the image frame may be pinned to the viewing surface. After that, the viewer may move the projector to different positions while holding the projector, or sit the projector on a table and the viewed image will be maintained in the same perspective view frame as the initial selected view.

20 Claims, 7 Drawing Sheets

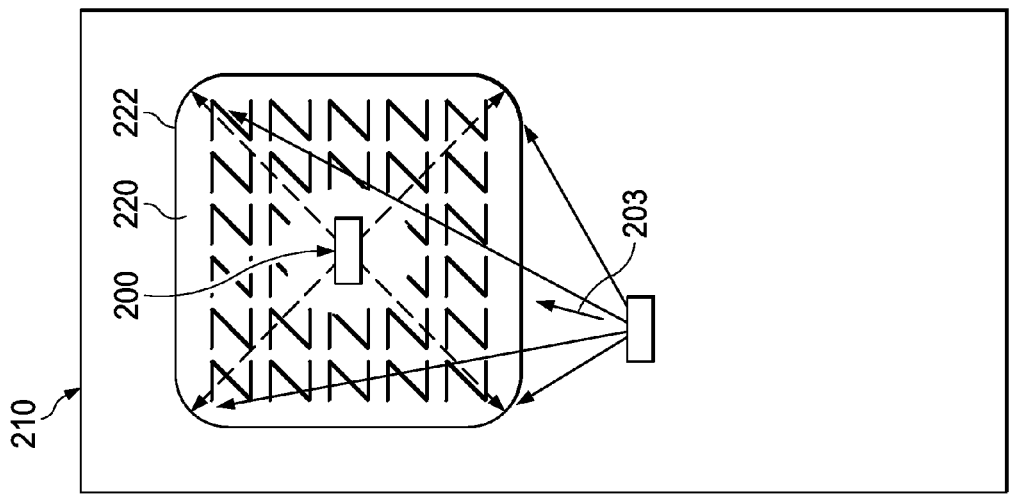
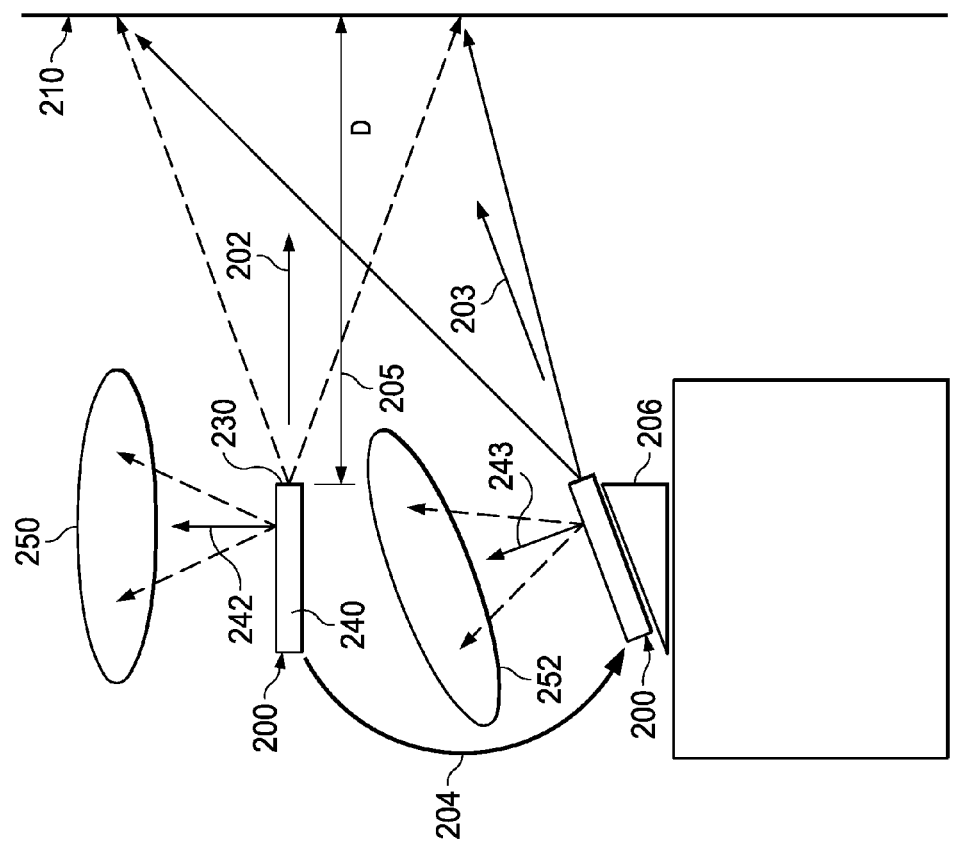
FIG. 2B
FIG. 2A

MAINTAINING DISTORTION-FREE PROJECTION FROM A MOBILE DEVICE

CLAIM OF PRIORITY UNDER 35 U.S.C. 119(e)

The present application claims priority to and incorporates by reference U.S. Provisional Application No. 61/735,336, filed Dec. 10, 2012, entitled "Method for Maintaining Distortion-Free Projection."

BACKGROUND OF THE INVENTION

1. Field of the Invention

Embodiments of the present invention generally relate to maintaining distortion-free projection from a mobile device.

2. Description of the Related Art

Hand-held projectors, such as the DLP Pico Projector available from Texas Instruments, are gaining in popularity as they get embedded into light-weight portable consumer electronic devices such as smart phones and cameras. The projector on these devices is used as a display mechanism to project digital content onto any suitable surface.

When using a projector in a hand-held device, perspective distortion of the display window may result when the projector is not held perfectly perpendicular to the projection surface. This distortion is sometimes referred to as keystone distortion. A telltale artifact of keystone distortion is that a rectangle in the projector plane appears as a non-right-angled quadrilateral on the projection surface.

SUMMARY OF THE INVENTION

Embodiments of the invention allow a user to select a still image or a video sequence and project it onto a viewing surface using a mobile device such as a smart phone. Once the viewer selects a preferred perspective view frame, the image frame may be pinned to the viewing surface. After that, the viewer may move the projector to different positions while holding the projector, or set the projector on a table, and the viewed image will be maintained in the same perspective view frame as the initial selected view.

BRIEF DESCRIPTION OF THE DRAWINGS

Particular embodiments in accordance with the invention will now be described, by way of example only, and with reference to the accompanying drawings:

FIGS. 1, 2A and 2B are illustrations of a smart phone with an embedded projector in various poses;

Figure 1:
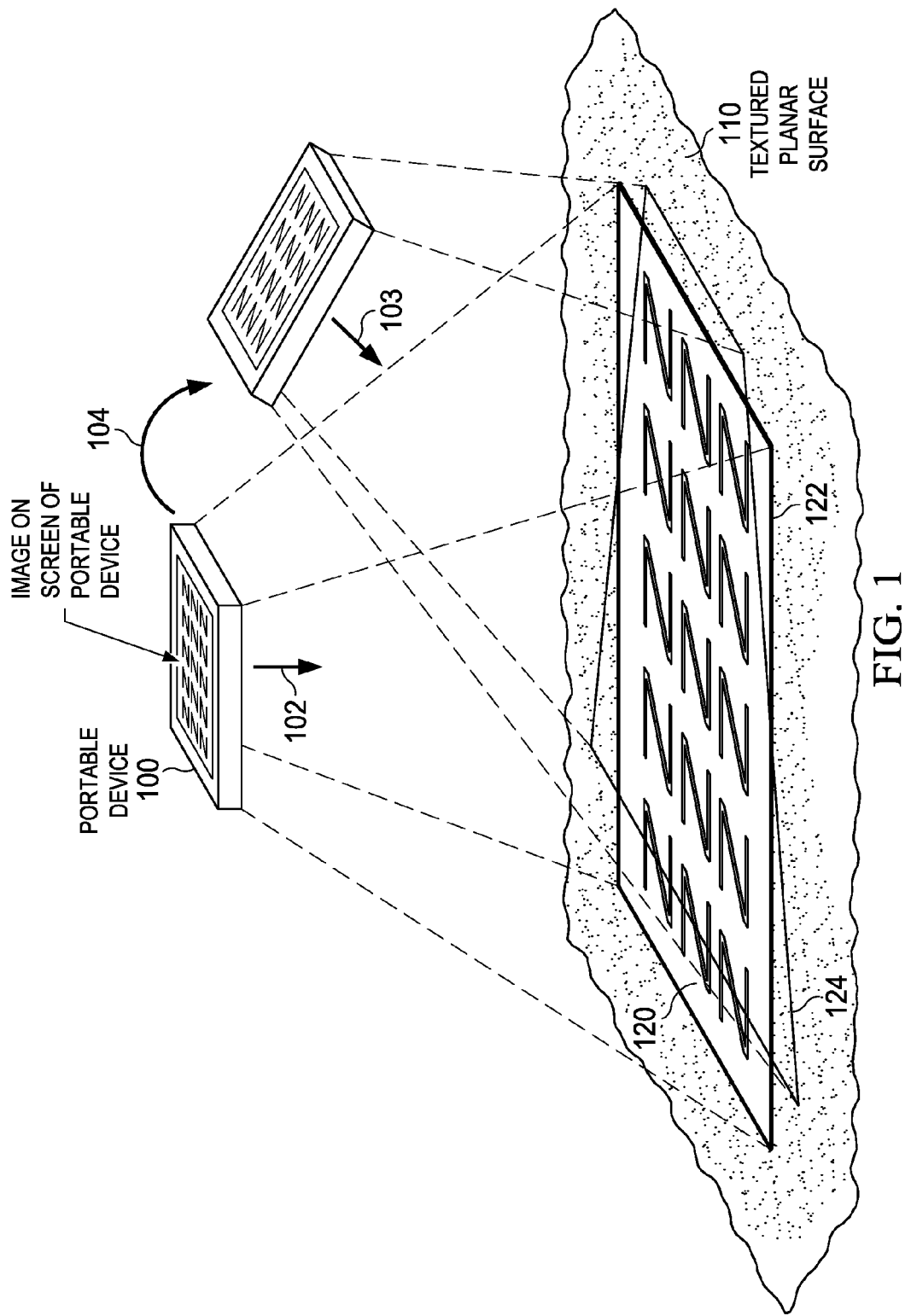

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

A key problem in using a projector in a hand-held device is the unwanted perspective distortion of the display window caused when the projector is not held perfectly perpendicular to the projection surface. This distortion is sometimes referred to as keystone distortion. A telltale artifact of keystone distortion is that a rectangle in the projector plane appears as a non-right-angled quadrilateral on the projection surface.

Ideally, a user would like the displayed content to always appear as though it was projected from a device held perfectly perpendicular to the screen, even as the user makes natural hand movements while holding the projector device. Embodiments of the invention enable such a user interaction. More specifically, content may be projected onto a screen surface without incurring keystone distortion even as the user moves the projector such that it is not perfectly perpendicular to the screen. Furthermore, embodiments of the invention may also compensate for motion of the projector along a normal to the projection surface by zooming in or out to maintain a constant size view frame.

Keystone distortion is often defined to be when a rectangle projects specifically onto a trapezoid. However, embodiments of the invention address the more general scenario of a rectangle projecting onto any non-right-angled quadrilateral and rely on a camera mounted at a known orientation with respect to the projector, as will be described in more detail below.

FIG. 1 is a pictorial illustration of a smart phone 100 with an embedded projector being held in various poses. At a first position, or pose, represented by vector 102, a projector embedded in the smart phone may project an image onto planar screen surface 110. In this illustration, the projector is assumed to be oriented to project perpendicular to the display screen on smart phone 100. However, in other embodiments, the projector may be oriented to project from a side, such as a top end of a smart phone; such a configuration is provided by a Galaxy Beam smart phone available from Samsung Electronics Co. Ltd., for example.

As illustrated, pose 102 is approximately perpendicular to screen surface 110 and a projected image 120 is in the form of a right angle rectangle, which provides an undistorted view of image 120. When phone 100 is moved through some random displacement 104 to new pose represented by vector 103, the projected image will naturally be distorted in a keystone fashion as illustrated by outline 124. As will be described in more detail below, embodiments of the invention allow a virtual frame 122 to be selected by a user of smart phone 100 and registered, or "pinned," to surface 110 so that even when the phone is moved to other poses, such as pose 103, the projected image will still appear within virtual frame 122.

FIG. 2A illustrates a smart phone 200 in which a projector 230 is mounted on an end of the smart phone housing. FIG. 2A illustrates a side view of screen 210 and smart phone 200 in two different positions relative to the screen. FIG. 2B illustrates a front view of screen 210 with smart phone 200 in the same two positions relative to the screen. As illustrated in FIG. 2B, an image 220 may be projected onto screen 210 by projector 230. A camera 240 is mounted so as to have a view perpendicular to a face of smart phone 200. In this example, camera 240 is illustrated as facing upward and has a view from the same surface as the display screen on the smart phone. Smart phone 200 typically may have another camera view from a back surface of the phone. In other embodiments, there may be only one camera view, which is typically oriented towards the back surface of the phone.

In a first position, projector pose 202 is essentially perpendicular to screen surface 210. As described with regard to FIG. 1, this pose will produce an image 220 that is essentially free of perspective distortion. A user of smart phone 200 may provide an input to smart phone 200 to cause virtual frame 222 to be "pinned" to screen surface 210 when the user wants the projector image to be maintained in a distortion free manner while the phone 200 is moved to a different projector pose.

For example, the user may want to move 204 the phone 200 to rest on a support stand 206 rather than continuing to hold phone 200 to maintain pose 202. In this position, the projector assumes a pose represented by vector 203. As illustrated in FIG. 2A, pose 203 has an upward rotated component relative to screen surface 210. As illustrated in FIG. 2B, pose 203 also has a sideways rotated component relative to screen surface 210. In a prior art projector, such a pose would result in an image having a non-symmetric keystone distortion due to the upward and sideways vector components of pose 203. However, as will be described in more detail below, by warp processing the image data prior to projecting it, projector 200 will continue to project an undistorted image that appears to remain within virtual frame 222 from projection pose 203. The warp processing may also include zooming in order to compensate for motion of the projector along a normal to the projection surface in order to maintain a constant size view frame.

Camera 240 has a known positional relationship to projector 230. In the example of FIG. 2, the pose 242 of camera 240 is always at 90 degrees to the pose 202 of projector 230. In FIG. 1, the camera is on the back surface of the phone and the pose of the camera is in line with the pose 102 of the projector. While camera 240 is in pose 242, it has a view of scene 250. In this example, scene 250 may be the ceiling of the room for example. Similarly, a camera view from the back surface of phone 200 while the projector is held in pose 202 would be toward the floor and furniture, for example.

By analyzing view 250 while the camera is in pose 242, and then by analyzing view 252 while camera 240 is in pose 243, embodiments may then be able to determine projector pose 203 since the physical relationship between camera poses 242, 243 and projector poses 202, 203 are known. Once projector pose 203 is determined, that information may be used to pre-process image data prior to projection in order to compensate for relocation motion 204 and thereby eliminate perspective distortion when the image is displayed on screen 210.

Figure 3:
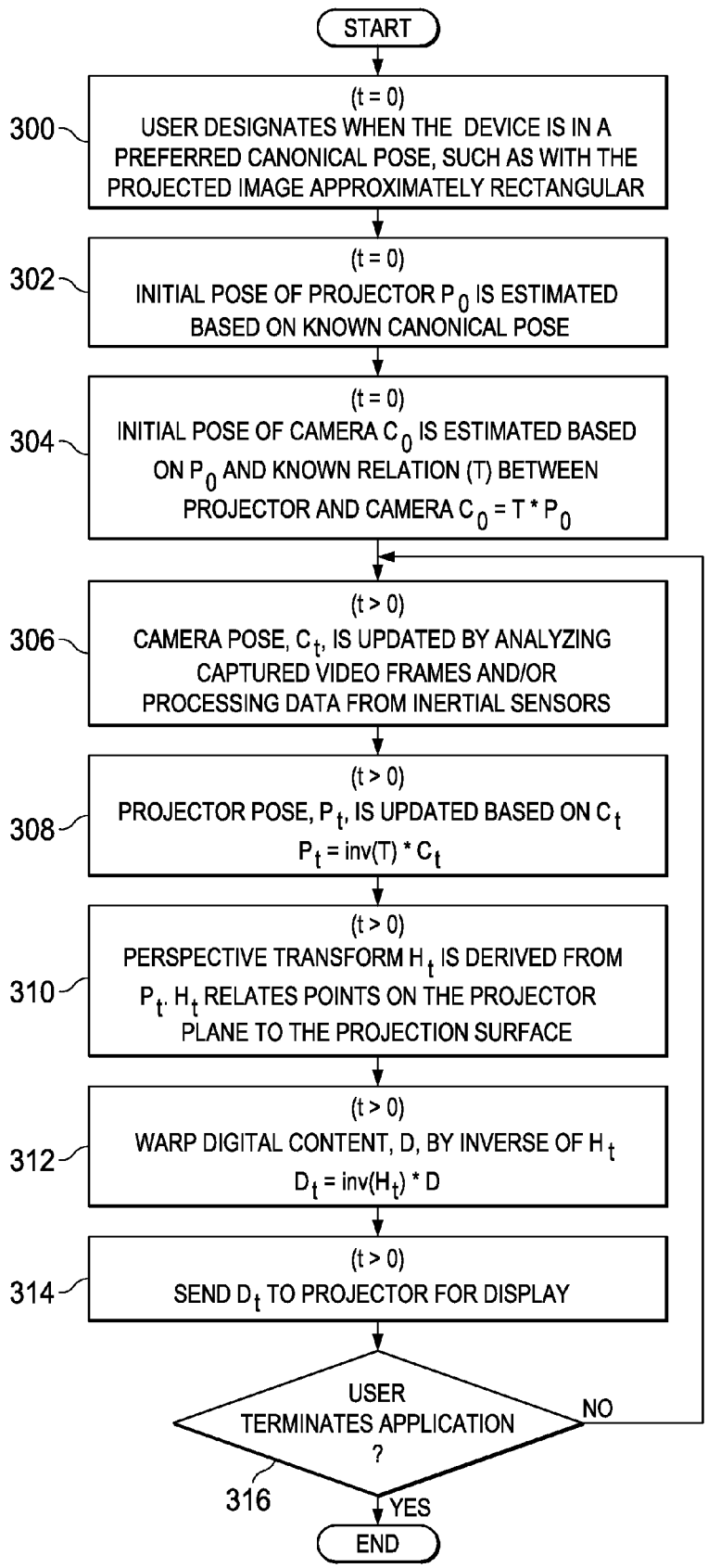
FIG. 3 is a flow chart illustrating a method for correcting perspective distortion using a camera mounted in a known relationship with a projector.

FIG. 3 is a flow chart illustrating a method for correcting perspective distortion for a projector physically coupled to a hand-held mobile device. The method uses a camera that is also physically coupled to the mobile device in a known positional relationship with the projector. As described above, a typical embodiment may be a smart phone with an embedded camera and an embedded projector. In another embodiment, the projector may be part of a sleeve or clip-on unit, for example, which is physically coupled to the smart phone.

While displaying an image or a video sequence, a user may position the hand-held device so that the projector creates an image on a projection surface that is pleasing to the user. Typically, this would be when the projected image has minimal keystone distortion. At an initial time, referred to as t=0, the user then designates 300 that the current projected image frame is a preferred or selected image frame that should be "pinned" to the viewing surface, as described with regard to FIGS. 2A-2B. The designation action may be performed in various manners, depending on the configuration and capabilities of the mobile device, such as, for example, by tapping a touch sensitive screen of the mobile device, by tapping a physical control button or key button on the mobile device, or by tapping a key, button or touch sensitive screen on another device that may be coupled to the mobile device in wired or wireless manner. While the selected projection frame may typically be rectangular such that the projected image would have insignificant perspective distortion, at other times, the user may prefer an image in which the initial projection frame is non-rectangular in order to produce a special effect or a purposely distorted image, for example.

Typically, the user initially positions the projector, P, such that it is close to being perpendicular to the projection surface. Based on this assumption, projector's initial pose P0 may be initialized 302 with respect to the projection surface using a world-view coordinate system. Assuming that the projector is perpendicular to the surface fully defines the rotation component of P0, but not the translation component, such as the distance from the screen as indicated in FIG. 2A at D 205. The translation component may be initialized to a pre-defined value. For example, the pre-defined value may have an initial default value based on a most likely projection distance for a particular mobile device and projector. The translation affects the scale of the projected content, which may be modified in an interactive manner, if the user so chooses. For example, an application program on the mobile device may include a settings or setup menu to allow projection distance to be specified/edited.

At this initial time (t=0), the camera's pose is also estimated 304. Depending on the physical location of the camera on the device, the camera may or may not have a view of the projection surface. Irrespective of the camera's field of view, an initial pose, C0, of the camera may be estimated. Once P0 has been initialized, given that the relative physical orientation between the camera and projector T is known, the initial camera pose can be estimated by equation (1) and mapped onto a current image view captured by the camera.

$$C0 = T*P0 \qquad (1)$$

The camera pose Ct at a later time t is updated 306 periodically. The periodic updates may be accomplished by processing images captured by the camera using known or later developed tracking techniques. For example, a typical tracking process may involve extracting distinctive feature points in the image and tracking these points over time. If additional inertial sensors such as gyroscopes or accelerometers are available on the mobile device, inputs from these devices may also be used to refine the camera pose estimate at time t.

Having computed Ct, the projector's subsequent pose Pt may be estimated using equation (2).

$$Pt = \text{inv}(T)*Ct \qquad (2)$$

Recall that Pt represents the pose (rotation and translation) of the projector with respect to the projection surface. Knowing Pt, a perspective transform Ht may be derived 310 that relates points between the projection surface and the projector plane. In other words, Ht defines how a rectangle on the projector plane will be deformed when shown on the projection surface after passing through the projector optics at the current projector pose Pt.

In order to compensate for perspective distortion at the current projector pose Pt, an inverse of Ht may be applied 312 to the 2D digital image/video content before sending the content to the projector. Let the 2D window of digital content be represented by D. A warped version Dt' of D may be computed as per equation (3).

$$Dt' = \text{inv}(Ht)*D \qquad (3)$$

Digital content Dt' is then sent 314 to the projector and projected onto the display surface. When warped Dt' is placed on the projector plane, the image on the projection surface appears as it did at time t=0 when the user held the projector in position to ensure minimal keystone distortion. Thus, Dt' projected from pose Pt has a perspective appearance similar to the initial image at pose P0. In this manner, keystone distortion may be corrected dynamically as the mobile device is moved by periodically updating the camera pose, projector pose, and Ht until the user terminates 316 the projection application. The rate of periodic updating may be selected based on camera image processing capability of the mobile device. More frequent updates will maintain a more stable projected image as the mobile device is moved through space.

Some intelligence may be applied to the update rate. For example, the update rate may be based on the perceived motion of the mobile device. Thus, while motion of the mobile device is occurring, the update rate may be selected to occur at a maximum rate. When motion of the mobile device stops, such as when the device is placed in a support stand or on a table, for example, the update rate may be reduced to a minimum rate in order to conserve battery energy. The perceived rate of motion may be determined from the difference in one camera pose to a next camera pose, for example.

Embodiments allow a user to select a still image or a video sequence and project it onto a view surface. Once the viewer selects a preferred perspective view frame, the image frame may be pinned to the viewing surface. Subsequently, the viewer may move the projector to different positions while holding the projector, or place the projector on a table, and the viewed image will be maintained in the same perspective view frame as the initial selected view.

Another way to compensate for keystone distortion may be to require the presence of an external calibrated camera. Such a solution requires a fixed camera installed at a known geometry that can observe the projected image. This is not currently a feasible solution for hand-held projectors Another way to compensate for keystone distortion may be to require inertial sensors on the device. Such a solution may utilize sensors such as gyroscopes to determine if the device is held at right angles to the gravity vector. If the projection surface is parallel to the gravity vector, this information may be used to determine when the projected image is likely to be distortion free. Kalman filtering may be used to improve sensor data accuracy, for example. Such a solution may increase the cost of a mobile device, however.

Another way to compensate for keystone distortion may be to require fiducial markers on the projection surface and a camera that can view the fiducial markers. Such a solution requires the presence of calibrated markings on the projection surface such that images from a camera viewing the surface can be processed to compute warping parameters to ensure that the projected content is distortion-free. Again, this is not a feasible solution for current hand-held projectors Compared to the known solutions described above, embodiments of present invention are applicable to desktop (stationary) and hand-held projectors and does not require inertial sensors. An external camera to the projection device is not required. Further, the projection surface is not required to have fiducial markers nor is the camera on the mobile device required to have a view of the projection surface. Embodiments merely require one camera coupled to the mobile device at a known arbitrary orientation to the projector.

Camera

Figure 4:
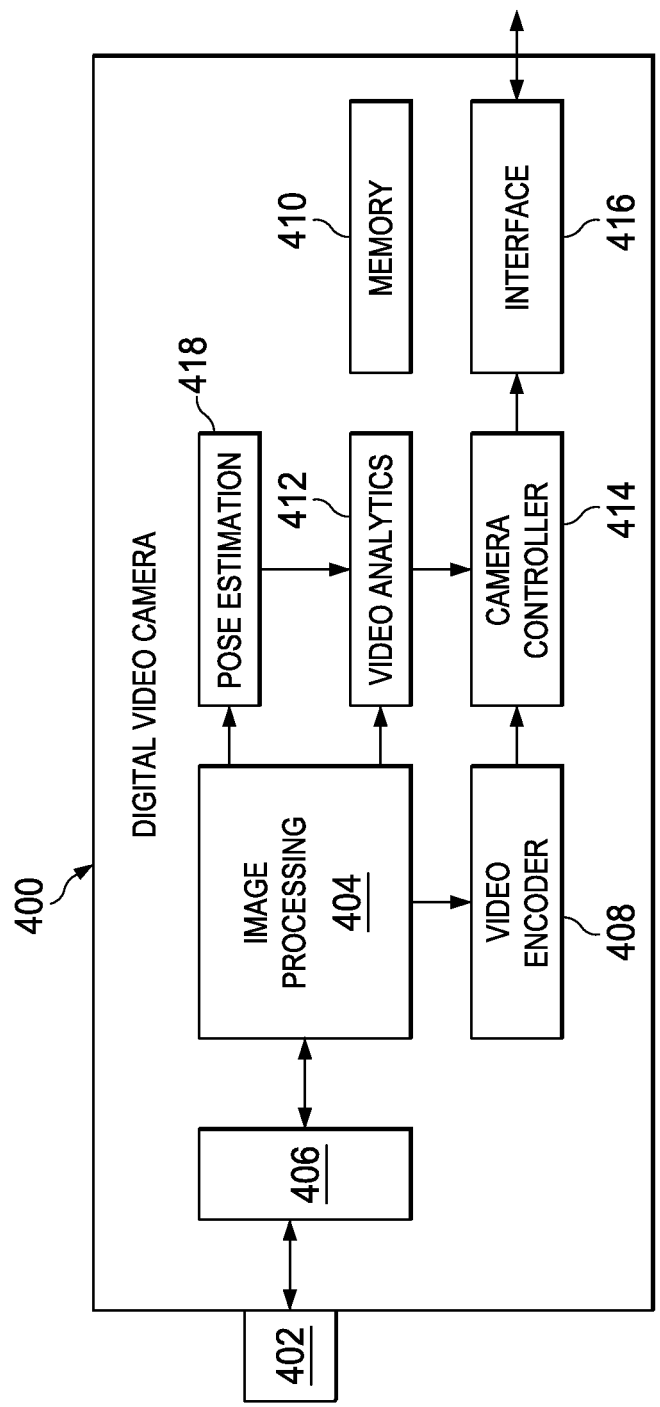
FIG. 4 is a block diagram of a digital camera contained within the smart phones of FIGS. 1-2B.

FIG. 4 is a block diagram of a digital camera 400 contained within the smart phones of FIGS. 1-2B. Camera 400 may be representative of camera 240 in FIG. 2A, for example. Digital video camera 400 may be configured to perform pose estimation as described herein. Camera 400 may include an imaging component 402, a controller component 406, an image processing component 404, a video encoder component 418, a memory component 410, a video analytics component 412, a camera controller 414, and a network interface 416. The components of the camera 400 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions such as software instructions embodying at least part of the pose estimation may be stored in memory in the memory component 410 and executed by one or more processors.

The imaging component 402 and the controller component 406 include functionality for capturing images of a scene. The imaging component 402 may include a lens assembly, a lens actuator, an aperture, and an imaging sensor. The imaging component 402 may also include circuitry for controlling various aspects of the operation of the component, such as, for example, aperture opening amount, exposure time, etc. The controller module 406 includes functionality to convey control information from the camera controller 414 to the imaging component 402, and to provide digital image signals to the image processing component 404.

The image processing component 404 divides the incoming digital signals into frames of pixels and may process each frame to enhance the image data in the frame. The processing performed may include one or more image enhancement techniques, such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment. Digital images from the image processing component 404 are provided to the video encoder component 408, the pose estimation component 418, and the video analytics component 412.

The video encoder component 408 may encode the images in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 410 may be on-chip memory, external memory, or a combination thereof. Any suitable memory design may be used. For example, the memory component 410 may include static random access memory (SRAM), dynamic random access memory (DRAM), synchronous DRAM (SDRAM), read-only memory (ROM), flash memory, a combination thereof, or the like. Various components in the digital video camera 400 may store information in memory in the memory component 410 as a video stream is processed. For example, the video encoder component 408 may store reference data in a memory of the memory component 410 for use in encoding frames in the video stream. Further, the memory component 410 may store any software instructions that are executed by one or more processors (not shown) to perform some or all of the described functionality of the various components.

Some or all of the software instructions may be initially stored in a computer-readable medium such as a compact disc (CD), a diskette, a tape, a file, memory, or any other computer readable storage device and loaded and stored on the digital video camera 300. In some cases, the software instructions may also be sold in a computer program product, which includes the computer-readable medium and packaging materials for the computer-readable medium. In some cases, the software instructions may be distributed to the digital video camera 400 via removable computer readable media (e.g., floppy disk, optical disk, flash memory, USB key), via a transmission path from computer readable media on another computer system (e.g., a server), etc.

The camera controller component 414 may control the overall functioning of the digital video camera 400. For example, the camera controller component 414 may adjust the focus and/or exposure of the imaging component 402 based on the focus quality and scene brightness, respectively, determined by the image processing component 404. The camera controller component 414 also controls the transmission of the encoded video stream via the network interface component 416 and may control reception and response to camera control information received via the network interface component 416. Further, the camera controller component 414 controls the transfer information from the video analytics component 412 via the network interface component 416.

The interface component 416 allows the digital video camera 400 to communicate with a monitoring system located within the mobile device.

The video analytics component 412 analyzes the content of images in the captured video stream to detect and determine temporal events not based on a single image. The analysis capabilities of the video analytics component 412 may vary in embodiments depending on such factors as the processing capability of the digital video camera 400, the particular application for which the digital video camera is being used, etc. For example, the analysis capabilities may range from video motion detection in which motion is detected with respect to a fixed background model to face recognition, object recognition, gesture recognition, feature detection and tracking, etc. As part of the analysis of the content of images, the video analytics component 412 may use the estimated pose from the pose estimation component 418. The pose estimation component 418 includes functionality to determine an initial pose of the camera 400 when an application needing pose estimation is started, to track the current pose of the camera 400, and to recover (re-initialize) the pose of the camera 400 in the event that incoming images are not sufficient (e.g., due to noise or temporal inconsistencies such as motion blur or dropped frames) to continue the pose tracking. The pose estimation component 418 may be configured to perform a method for pose estimation as described herein in reference to FIG. 5.

Pose Tracking

Figure 5:
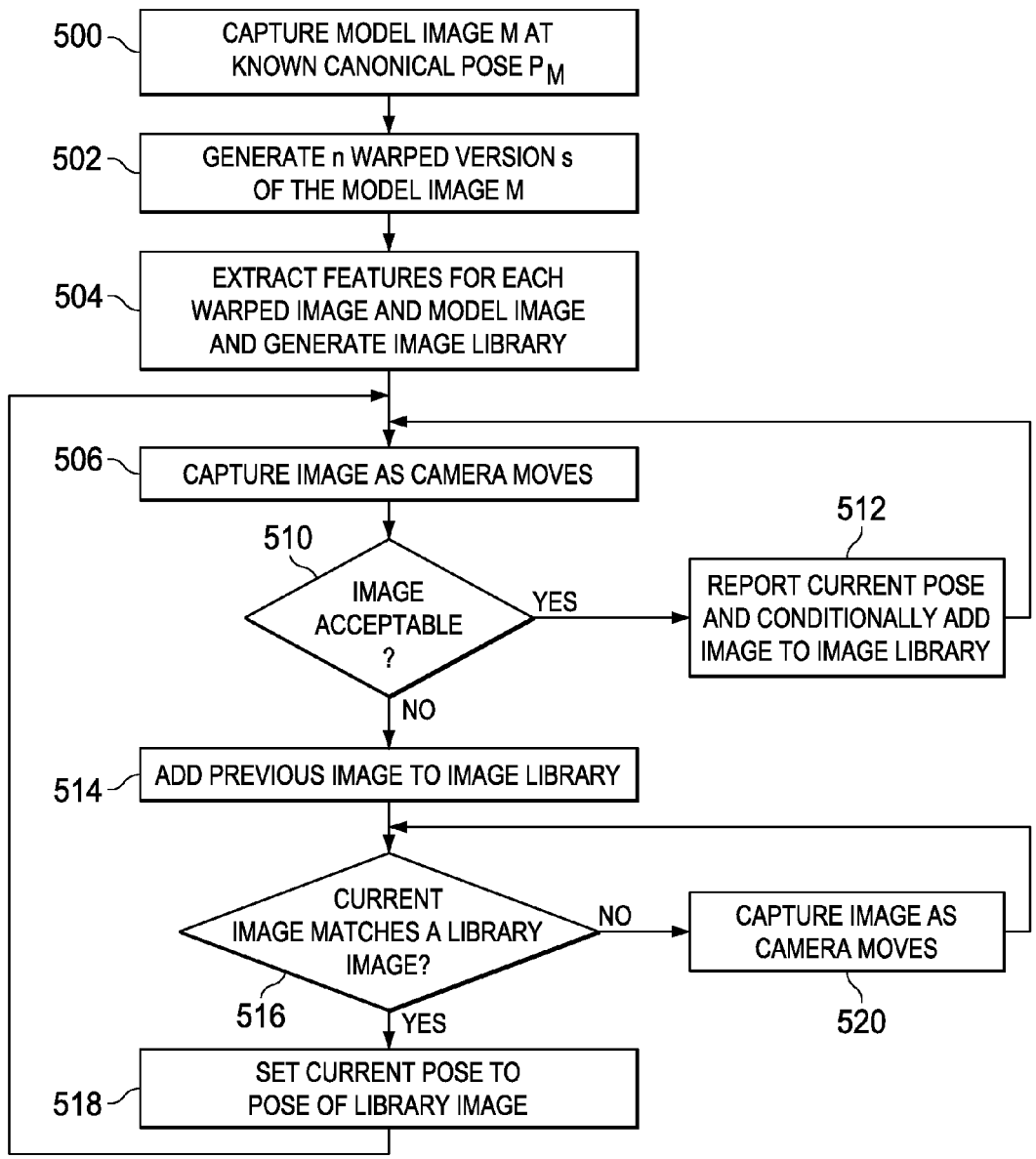
FIGS. 5 and 6 illustrate a method for determining camera pose.

FIG. 5 is a flow diagram of a method for camera pose estimation that may be performed, for example, in a digital camera such as that of FIG. 4. This method is described in more detail in U.S. patent application Ser. No. 14/051,161 filed Oct. 10, 2013, entitled "Camera Pose Estimation" which is incorporated by reference herein. This method may be viewed in three parts: pose estimation initialization, pose estimation normal operation, i.e., pose tracking, and pose estimation recovery. For initialization, e.g., at application start-up, a "model" image M is captured 500 when the user is holding the projector in a desired orientation and designates the current projected image frame should be pinned to the projection surface. That is, the image M is captured when the camera is positioned in a user designated initial pose. The initial camera pose for this model image is denoted as PM.

Given the model image M, n transformed (warped) versions of the image may be generated 502 by applying known transformations. That is, each of n warped images Wi, $1 \leq i \leq n$, are generated by applying a transformation Ti, to the model image M to generate an image Wi that replicates how the planar scene in the image M would appear if the camera is at a different pose, as shown by equation (4).

$$W_i = T_i(M) \tag{4}$$

Any suitable transformations may be used. The transformations Ti correspond to common (expected) poses relative to the model M. For example, if the scene is assumed to be planar, a common transformation that may be used is a homography which is a 3×3 matrix of nine parameters. The set of nine parameters of a homography matrix describes the perspective transformation of a planar scene. Each homography matrix corresponds to a particular rotation and translation (or pose) of a calibrated camera with respect to the planar scene. Application of this matrix to the model image M results in an image Wi corresponding to how the camera would see the scene when placed in a particular position corresponding to the parameters.

The effect of applying the transformation to the model image is to create n warped images, Wi, that capture the appearance of the planar scene of the model image from n different camera poses. That is, the transformations Ti simulate n known camera poses. Any suitable value of n, e.g., 80, may be used. Some factors that may be considered in the choice of the value of n include: 1) the larger the value of n, the larger the amount of time needed to generate the warped images and the larger the amount of memory needed to store the warped images and the associated pose data; 2) the larger the library, the longer the amount of time needed to search the library for matches (the importance of which will be apparent in later detailed description); and 3) n is sufficiently large such that the library is adequate for pose estimation (i.e., too few warped images will provide unsatisfactory results).

Features are also extracted 504 and stored for each of the warped images Wi and the model image M. The features of the ith image are denoted by Fi. A feature typically corresponds to a point in the image and is represented by a descriptor that captures the appearance of the local neighborhood around that point. Any suitable technique may be used to compute the features for an image. An example of a suitable technique may be found in G. Klein and D. Murray, "Parallel Tracking and Mapping on a Camera Phone," Proc. Eighth International Symposium on Mixed and Augmented Reality, pp. 83-86, October, 2009, Orlando, Fla.

Note that the net effect of the pose estimation initialization, i.e., capturing the model image, generating the warped images, and extracting the features of each image, is the generation of a library, or set, of known images S={(F0, P0), (F1, P1), (F2, P2), (F3, P3) . . . (Fn, Pn)}. For simplicity, the model image is considered to be part of the set of images, i.e., let M=W0=T0(M), where T0 is the identity matrix. The library of images may be stored in the memory 110 of the camera 100 of FIG. 4, for example.

Once the pose estimation is initialized, the pose tracking begins, i.e., the camera pose is continually updated and reported for images in the input video stream. Images are captured 508 as the camera (or a device incorporating the camera) is moved. If an image captured at time t is acceptable 510, e.g., the image is not too noisy and/or is temporally consistent, the current pose is reported 512 to interested components, e.g., the video analytics component 512. The image may also be added 512 to the image library under certain conditions. In some embodiments, the number of images that may be added to the image library is limited to some number, e.g., 20, and new images are added in a first-in-first out (FIFO) fashion.

At time t, an image (i.e., the associated pose and computed features) is added to the image library if the following two conditions are satisfied. First, the condition t−s>D1 must be satisfied where s is the time when the last image was added to the image library and D1 is an elapsed time threshold. In other words, the current image is added if a sufficient amount of time D1 has passed since the last entry into the set. The value of D1 may be any suitable value. The choice of a value for D1 may depend on factors such as how fast the camera is expected to move for a particular application and how much memory and compute power the device has to process new entries in the library.

Second, the condition difference (Pt, Pi)>D2, for all Pi elements of the library S must be satisfied where D2 is a difference threshold. That is, the pose Pt of the current image must be sufficiently different from all the poses contained in the image library S. Any suitable technique may be used to determine the pose Pt. In some embodiments, a camera pose P may be represented as the [x, y, z] coordinates of the camera position and another triplet that represents the camera orientation. Thus, computation of the difference between the current pose Pt and the poses in the image library may be very efficient—how far apart are the two poses and the angle between the two poses.

The value of D2 may be any suitable value. The choice of a value for D2 may depend on factors such as how fast the camera is expected to move for a particular application and how much memory and compute power the device has to process new entries in the library. Note that if the values of D1 and/or D2 are low, many images may be added to the library, causing high load on system resources. Conversely, if the values of D1 and/or D2 are high, the library may not contain enough landmark images at different poses to effectively help in pose re-initialization.

Figure 6:
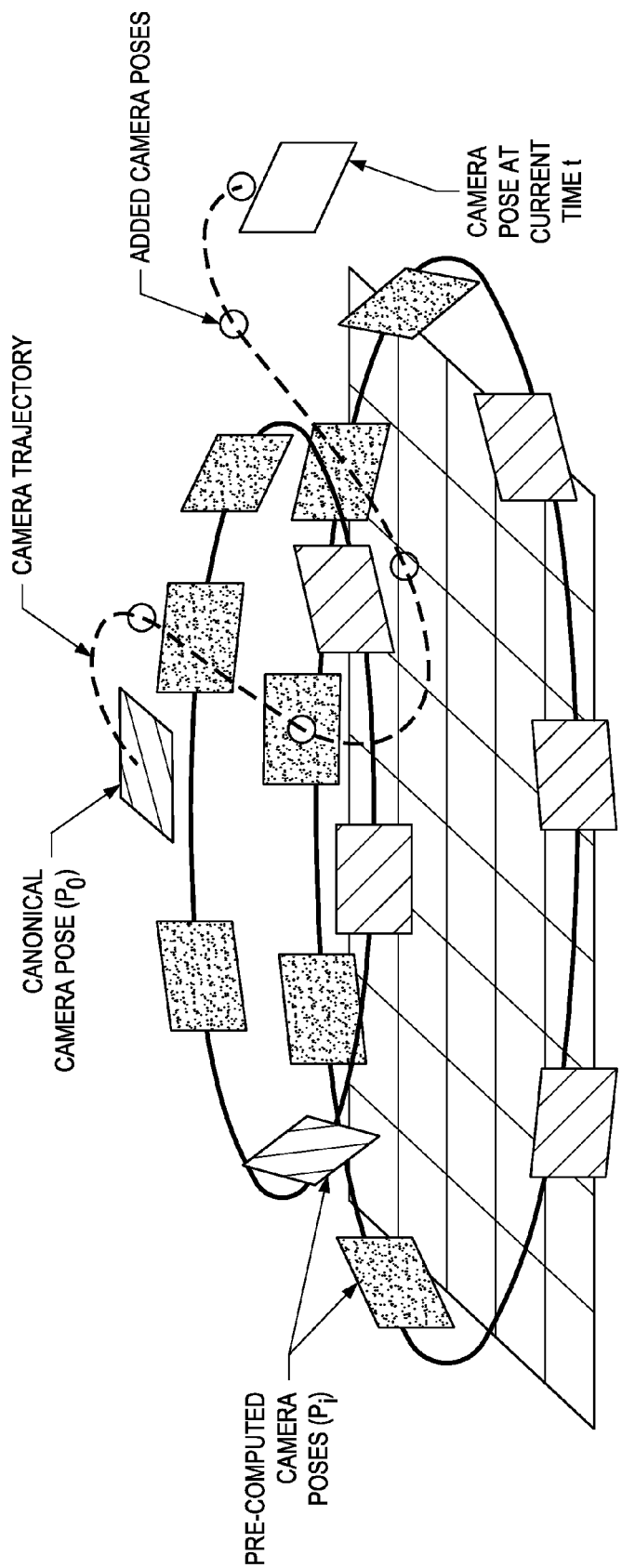

FIG. 6 is an example of a set of initial poses Pi, 0<=i<=n, and camera poses added to the image library S as the camera is moved through the scene. This example shows the various initial poses in two rings or a hemisphere looking down at the scene. The different shadings indicate different poses in the three dimensional scene. The small circles indicate images/poses added to the image library as the camera is moved along the indicated trajectory.

Referring again to FIG. 5, if an image captured at time t, It, is not acceptable 510, then the camera pose update cannot continue as the images being received are not suitable for continuing pose estimation without re-initialization. At this point, a pose estimation re-initialization phase is entered with the assumption that the camera is moved in space within the scene with the intent of resuming the user experience. The image captured at time t−1, i.e., the features of image It−1 and the corresponding pose Pt−1, are added 514 to the image library. Since the pose update is interrupted at time t, the image at time t−1 is assumed to be captured at a valid pose.

After the image It−1 is added to the image library, an attempt is made to find a match 516 between the current image It and an image in the image library (as augmented by images added as the camera was moved). If a match is found, then the current pose is set 518 to the pose of the matching image and normal pose estimation processing continues 508 with the next image. If no match is found 516, then the next image is captured 520 and an attempt is made to match 516 this image with one of the images in the set of warped images. The capture and match process is repeated until a match is found and the pose is re-initialized.

Since the size of the image library (set) S can be large, the process of searching for the best match may be split across several time instances to enable real time processing. Any suitable approach may be used for searching the image library. One approach that may be used is as follows. First, the current image is compared to the most recent addition to the library S, i.e., It−1. If there is no match, then the current image is compared to the model image M. If there is no match, then the current image is compared against m other images in the image library.

All the comparisons may be done in feature space. That is, the features Ft of the image It are first compared to the features Ft−1 of the most recent image It−1 added to the library S. If the match score exceeds a pre-defined threshold, then the current image It matches with that image. Any suitable technique may be used to determine the match score. For example, the match score may be some form of distance measure between the features. In some embodiments, symmetric transfer error is used to quantify the match between feature sets. The value of the matching threshold may be determined empirically based on the amount of noise expected in the image capture process and the amount and speed of motion expected.

If the match score is below the threshold, the features Ft are compared to the features F0 of the model image M. If the match score is again below the threshold, then the features are compared to the features of a maximum of m images from the set. As soon as a satisfactory match is found, the pose is updated to the pose of the matching image. If none of the m images are a satisfactory match, the current camera pose is declared to be invalid, and the next input image, It+1 is processed. Again, Ft+1 is first compared to Ft−1. If there is no match, then Ft+1 is compared to F0. If there is no match, a new set of m library images are chosen for evaluation. The m images at time t+1 are distinct from those compared at time t. If no match is found, the same process repeats at time t+2, etc.

In this way, if there are n images in the library, n/m time instances are needed to search the entire library for a valid match. For example, assume that the library size is n=100, where there are 80 images corresponding the set of warped images generated at initialization, and 20 images corresponding to a circular buffer of images added to the image library during normal pose estimation. In order to meet real-time constraints, m may be limited to two. Therefore, during pose re-initialization, every input image is compared against the image $I_{t-1}$, the model image M, and at most two other library images until a match is found. The library images are exhausted after 50 input images. Then, as new input images are captured, the library is searched again. Assuming a modest processing rate of 15 fps, it may take about 3 seconds to search through a library of 100 images.

In another approach to tracking camera pose, the camera pose estimation algorithm has a-priori knowledge of the background scene. In this approach, warped versions of the background scene are generated in an offline phase. Thus, to initialize or recover the camera pose estimate, the algorithm can compare input images against the pre-generated warped images to estimate the pose. This approach may be useful when the mobile device is used within a constrained space, for example.

In another approach, pose-invariant feature descriptors are used. In this approach, the features, F, computed from an image are invariant to changes in camera pose. Thus, even as the camera pose changes from the first image I0, to image It at time t, the algorithm can establish sufficient matches between F0 and Ft to recover the camera pose at time t. While use of pose-invariant features is powerful, their use is very computationally intensive, and hence, currently not widely deployed for embedded real-time use.

Projector

Referring again to FIG. 2A, projector 230 may be implemented using an optical semiconductor known as the DLP® chip (digital light processing chip), which was invented by Dr. Larry Hornbeck of Texas Instruments in 1987. The DLP chip is perhaps the world's most sophisticated light switch. Currently, a typical DLP chip contains a rectangular array of up to 8 million hinge-mounted microscopic mirrors; each of these micromirrors measures less than one-fifth the width of a human hair. When a DLP chip is coordinated with a digital video or graphic signal, a light source, and a projection lens, its mirrors can reflect a digital image onto any surface.

A DLP chip's micromirrors tilt either toward the light source in a DLP projection system (ON) or away from it (OFF). This creates a light or dark pixel on the projection surface. The bit-streamed image code entering the DLP semiconductor directs each mirror to switch on and off up to ten thousand times per second. When a mirror is switched on more frequently than off, it reflects a light gray pixel; a mirror that's switched off more frequently reflects a darker gray pixel. In this way, the mirrors in a DLP projection system can reflect pixels in up to 1,024 shades of gray to convert the video or graphic signal entering the DLP chip into a highly detailed grayscale image.

The white light generated by the light source in a DLP projection display system may pass through a color filter as it travels to the surface of the DLP chip. This filters the light into a minimum of red, green, and blue, from which a single-chip DLP projection system can create at least 16.7 million colors. Many DLP projection display systems offer solid-state illumination which replaces the traditional white lamp. As a result, the light source emits the necessary colors eliminating the color filter. In some DLP systems, a 3-chip architecture is used, particularly for high brightness projectors required for large venue applications such as concerts and movie theaters. These systems are capable of producing no fewer than 35 trillion colors.

System Example

Figure 7:
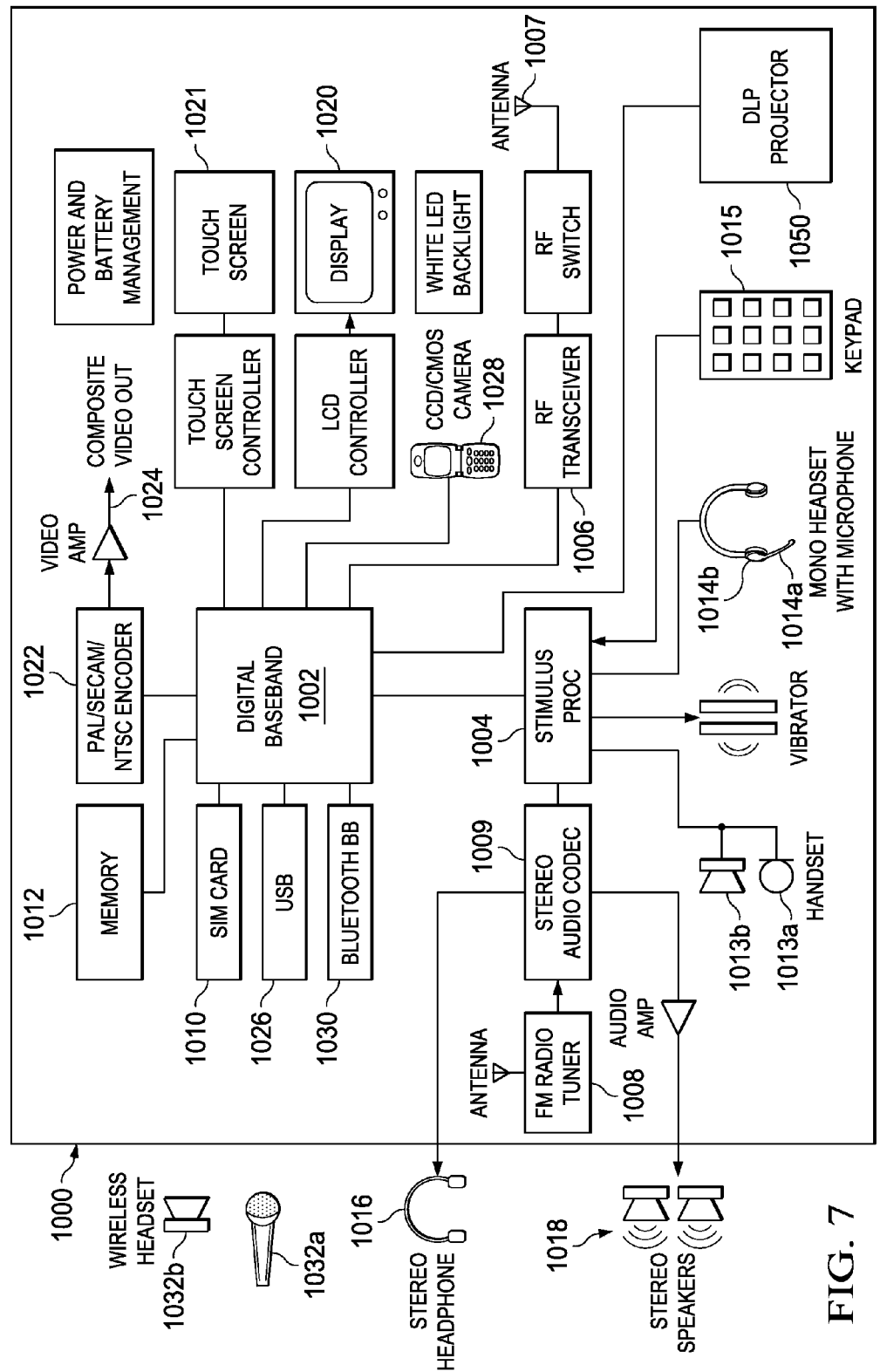
FIG. 7 is a more detailed block diagram of a smart phone with an embedded projector and camera.

FIG. 7 is a block diagram of an exemplary mobile cellular phone 1000 that includes an embodiment of the present invention. Digital baseband (DBB) unit 1002 may include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 may also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

Projector 1050 is a DLP projector chip that is operable to project a still image or a video stream onto a projection surface located several feet or several yards away from mobile device 1000, as described in more detail above. Image data may be received from various sources, such as memory 1012, simcard 1010, memory within camera 1028, for example. Image data may be downloaded on a data channel from a cellular network, for example. Regardless of the source, a user may designate a preferred projector pose by tapping on keypad 1015 or touch screen 1021, for example. Camera 1028 will then capture a model image and an initial camera pose will be determined based on an initial projector pose assumption and mapped onto the model image. Subsequent camera poses may be determined using the tracking process as described above, for example. Updated projector poses will then be determined based on the current camera pose and a known physical orientation between camera 1028 and projector 1050, as described above in more detail. A perspective transform Ht is derived responsive to each subsequent projector pose and the image data is warp processed using an inverse of Ht prior to projecting a subsequent image from the projector. In this manner, the subsequent image on the projection surface has a perspective appearance similar to the initial image.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein. For example, embodiments are described herein in which features and poses are stored in an image library. One of ordinary skill in the art will understand embodiments in which rather than storing features in the library, the images and feature coordinates may be stored in a database or other file structure.

While the embodiments described herein describe a projector that is mounted within the housing of a mobile smart phone, in another embodiment the projector may be contained in a projector sleeve that is configured to receive and couple to a smart phone to form a combined mobile unit in which the projector in the sleeve and a camera within the smart phone have a known physical orientation to each other.

In some embodiments, a separate camera may be attached to a stand-alone projector to allow dynamic projector pose determination and image correction to be performed as described herein.

In some embodiments, a single processor may be used to execute instructions to perform camera image capture and pose tracking, control operation of the projector, and perform image data warping prior to projection. In other embodiments, two or more processors may cooperate to perform the various tasks.

While embodiments described herein assume a fixed orientation for the camera and projector, another embodiment may provide a flexible mounting arrangement for either the camera, the projector, or both. In such an embodiment, a mechanism may be provided to determine a relative pitch for the camera and/or projector so that the current physical orientation of each is known.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for projecting an image by a mobile device, the method comprising:
    projecting an initial image from a projector of the mobile device onto a projection surface;
    capturing a model image by a camera of the mobile device in response to a user action to initialize a projector pose at a user selected position relative to the projection surface, wherein the camera has a known physical relationship T to the projector;
    determining an initial camera pose relationship to the model image;
    determining a subsequent camera pose after movement of the mobile device by processing a subsequent image captured by the camera;
    determining a subsequent projector pose using T;
    deriving a perspective transform Ht responsive to the subsequent projector pose; and
    processing image data using an inverse of the perspective transform Ht prior to projecting a subsequent image from the projector, such that the subsequent image on the projection surface has a perspective appearance similar to the initial image.

2. The method of claim 1, wherein the user action comprises receiving an input from a touch sensitive screen component of the mobile device.

3. The method of claim 1, further comprising assuming the projector pose at the user selected position is perpendicular to the projection surface.

4. The method of claim 1, further comprising using a predefined displacement value between the projector and the projection surface to initialize the projector pose.

5. The method of claim 1, wherein determining a subsequent camera pose comprises:
    generating n warped image versions of the model image;
    extracting features of each warped image to form an image library; and
    comparing the features extracted from the subsequent image to the image library.

6. The method of claim 1, wherein determining a subsequent camera pose further comprises processing movement data from an inertial sensor component of the mobile device.

7. The method of claim 1, wherein determining a subsequent camera pose, projector pose, and perpective transform Ht are performed in a periodic manner.

8. The method of claim 7, further comprising deriving a rate of motion of the mobile device, wherein a periodic rate of determining a subsequent projector pose is responsive to the rate of motion.

9. A mobile device comprising:
    processing logic encased in a housing;
    a user input device coupled to the processing logic;
    a camera mounted to the housing, wherein the camera is controllably coupled to the processing logic; and
    a projector affixed to the housing in a known orientation T with respect to the camera, wherein the projector is controllably coupled to the processing logic, wherein the projector is operable to project an initial image onto a projection surface;
    wherein the camera is operable to capture a model image in response to a user action on the user input device to initialize a projector pose at a user selected position relative to the projection surface;
    wherein the processing logic is operable to:
        determine an initial camera pose relationship to the model image;
        determine a subsequent camera pose after movement of the mobile device by processing a subsequent image captured by the camera;
        determine a subsequent projector pose using T;
        derive a perspective transform Ht responsive to the subsequent projector pose; and
        process image data using an inverse of the perspective transform Ht prior to projecting a subsequent image from the projector, such that the subsequent image on the projection surface has a perspective appearance similar to the initial image.

10. The mobile device of claim 9, wherein the user action comprises receiving an input from a touch sensitive screen component of the mobile device.

11. The mobile device of claim 9, wherein the processing logic is further operable to assume the projector pose at the user selected position is perpendicular to the projection surface.

12. The mobile device of claim 9, wherein the processing logic is further operable to use a pre-defined displacement value between the projector and the projection surface to initialize the projector pose.

13. The mobile device of claim 9, wherein the processing logic is further operable to determine a subsequent camera pose by:
   generating n warped image versions of the model image;
   extracting features of each warped image to form an image library; and
   comparing the features extracted from the subsequent image to the image library.

14. The mobile device of claim 9, wherein the processing logic is further operable to determine a subsequent camera pose by processing movement data from an inertial sensor component of the mobile device.

15. The mobile device of claim 9, wherein the processing logic is further operable to determine a subsequent camera pose, projector pose, and perspective transform Ht in a periodic manner.

16. The mobile device of claim 15, wherein the processing logic is further operable to derive a rate of motion of the mobile device, wherein a periodic rate of determining a subsequent projector pose is responsive to the rate of motion.

17. A non-transitory computer readable medium storing software instructions that, when executed by at least one processor in a mobile device, cause a method of image correction to be performed, the method comprising:
   projecting an initial image from a projector located in the mobile device onto a projection surface;
   capturing a model image by a camera located within the mobile device in response to a user action to initialize a projector pose at a user selected position relative to the projection surface, wherein the camera has a known physical relationship T to the projector;
   determining an initial camera pose relationship the model image;
   determining a subsequent camera pose after movement of the mobile device by processing a subsequent image captured by the camera;
   determining a subsequent projector pose using T;
   deriving a perspective transform Ht responsive to the subsequent projector pose; and
   processing image data using an inverse of the perspective transform Ht prior to projecting a subsequent image from the projector, such that the subsequent image on the projection surface has a perspective appearance similar to the initial image.

18. The method of claim 17, further comprising assuming the projector pose at the user selected position is perpendicular to the projection surface.

19. The method of claim 17, further comprising using a pre-defined displacement value between the projector and the projection surface to initialize the projector pose.

20. The method of claim 17, wherein determining a subsequent camera pose comprises:
   generating n warped image versions of the model image;
   extracting features of each warped image to form an image library; and
   comparing the features extracted from the subsequent image to the image library.

* * * * *